H. A. HOLZER.
MINE CAR WHEEL.
APPLICATION FILED JULY 16, 1912.

1,074,363. Patented Sept. 30, 1913.

Witnesses:
Geo. R. Kadson
C. M. Badger

Inventor
H. A. Holzer.
By Bakewell & Cherr Attys.

UNITED STATES PATENT OFFICE.

HIRAM A. HOLZER, OF PITTSBURG, KANSAS, ASSIGNOR TO UNITED IRON WORKS COMPANY, OF SPRINGFIELD, MISSOURI, A CORPORATION OF MISSOURI.

MINE-CAR WHEEL.

1,074,363.	Specification of Letters Patent.	Patented Sept. 30, 1913.

Application filed July 16, 1912. Serial No. 709,646.

*To all whom it may concern:*

Be it known that I, HIRAM A. HOLZER, a citizen of the United States, residing at Pittsburg, Kansas, have invented a certain new and useful Improvement in Mine-Car Wheels, of which the following is a full, clear, and exact description, such as will enable others skilled in the art to which it appertains to make and use the same.

This invention relates to wheels and axle-boxes such as are used on mine cars, trucks and similar vehicles.

One object of my invention is to provide a wheel of the character described which is so designed that the oil or grease used to lubricate same cannot leak out.

Another object is to provide a wheel for trucks, mine cars, etc., which is so designed that hard lubricating grease can be used in same successfully.

Another object is to provide a truck or mine car wheel having an oil-tight lubricating chamber that receives the axle on which the wheel is mounted.

Another object is to provide a wheel and axle-box which are so designed that the wheel can be applied or removed quickly and easily. And still another object is to provide a wheel and axle-box that have portions which coöperate with a removable device that retains the wheel in operative position on the axle.

Other objects and desirable features of my invention will be hereinafter pointed out.

Figure 1:
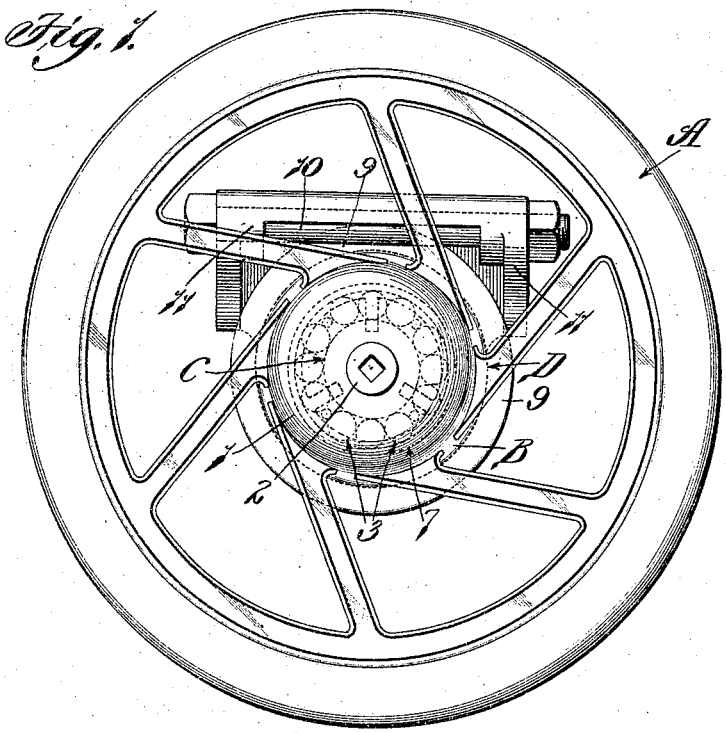
Figure 2:
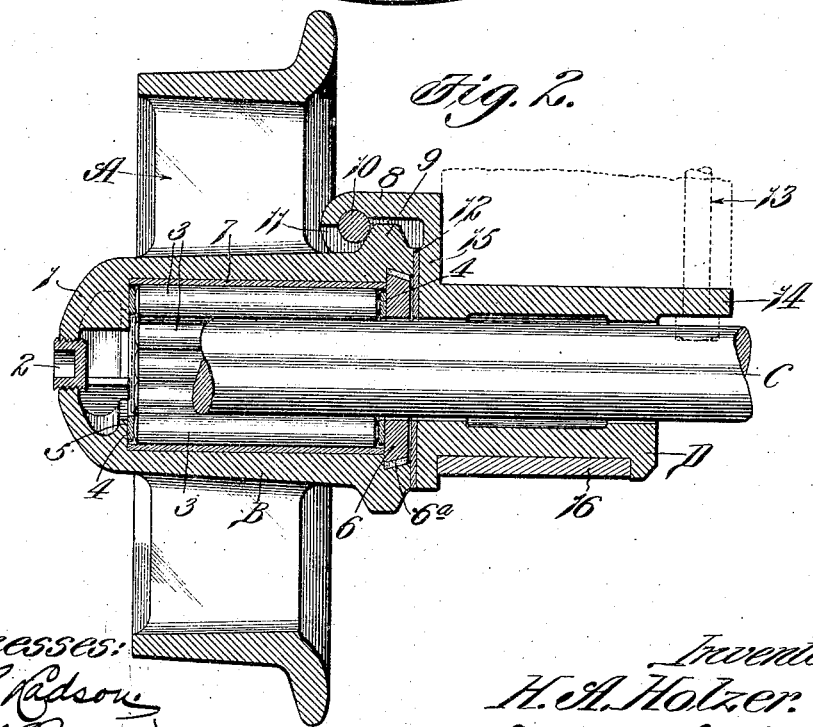

Figure 1 of the drawings is a side elevational view of a wheel and axle-box constructed in accordance with my invention; and Fig. 2 is a vertical longitudinal sectional view of the wheel and axle-box.

Referring to the drawings which illustrate the preferred form of my invention, A designates a wheel that is particularly adapted for use on mine cars, trucks, and similar vehicles, and B designates the hub portion of the wheel provided with a lubricating chamber which receives the outer end portion of an axle C that passes through an axle-box D which is secured to the body of the vehicle, as shown in broken lines in Fig. 2. The hub B of the wheel is provided at its outer end with a cap 1 which may either be detachable or formed integral with the hub. In the embodiment of my invention herein shown, the cap 1 is integrally connected to the hub and is provided with a filling opening that is normally closed by a removable closure 2, such, for example, as a socketed plug that is screwed into the cap. A roller bearing or ball bearing of any suitable type is arranged in the lubricating chamber of the hub so as to coöperate with the axle C, the bearing herein shown consisting of a plurality of longitudinally disposed rollers 3 which are retained in proper position by means of a cage comprising end rings 4 and longitudinally disposed spacing members. The outer end ring 4 of the cage bears against an annular shoulder 5 on the interior of the hub and the inner end ring of the cage bears against a washer 6 which is permanently connected to the hub after the roller bearing has been arranged in operative position inside of the lubricating chamber.

Preferably, a split steel bushing 7 is arranged inside of the hub B of the wheel, as shown in Fig. 2, so as to form a hard wear-resisting surface for the rollers. The retaining washer 6 can be connected to the hub of the wheel in any suitable manner but I prefer to use a beveled washer which is locked in a beveled or undercut recess in the hub by means of some suitable metal 6ª that can be molded or cast in the space between the retaining washer and the undercut recess, the washer 6 being so arranged that it does not extend out far enough to lie flush with the inner end face of the hub.

The axle-box D through which the axle passes, is provided at its upper end with a horizontally disposed laterally projecting portion 8 that laps over a ring-shaped rib or flange 9 on the end portion of the hub, said laterally projecting portion 8 being so designed that it partially embraces a removable wheel-retaining bolt 10 which passes transversely through perforated lugs 11 on the box D. When the wheel is arranged in operative position on the axle, as shown in Fig. 2, any outward movement of the wheel is resisted by the bolt or wheel-retaining device 10, and any inward movement of the wheel is resisted by the outer end face of the axle-box that lies directly opposite the inner end face of the hub of the wheel. Preferably, a steel washer 12 is interposed between the inner end of the hub and the end face of the axle-box so as to reduce the wear on these parts. The axle-box D is adapted to be connected to the under side of the body of the car or vehicle by means of bolts or other suitable fastening devices 13 that pass upwardly through a flange 14 at the inner end of the box, and at the front end of the box is an upwardly projecting flange 15 that bears against the side of the car and thus takes the strain off the bolts 13 and prevents the box from twisting or turning, the perforated lugs 11 and horizontally disposed portion 8 on the box being formed integral with the flange 15. In practice, the axle-boxes on each side of the car are connected together by a strap 16 that fits in recesses on the under side of the boxes, as shown in Fig. 2.

To mount the wheel it is only necessary to arrange it in longitudinal alinement with the axle-box, then slip the axle endwise through the washer 12 into the hub of the wheel, and thereafter insert the bolt 10 in the lugs 11 which project laterally from the front end of the box. The lugs 11 are so disposed that the bolt 10 will extend transversely across the hub of the wheel in front of the ring-shaped flange 9 on the hub and will thus prevent the wheel from moving longitudinally of the axle away from the car, the front face of the ring-shaped flange 9 being preferably inclined and merging gradually into the outer surface of the hub B. When it is desired to remove the wheel, the bolt 10 is withdrawn and the wheel can then be slipped endwise off the axle, the lugs 11 and laterally projecting portion 8 on the box being so disposed that they do not contact with the flange or annular rib 9 on the hub of the wheel.

In view of the fact that the hub of the wheel is provided with an oil-tight compartment for holding the grease or oil that is used to lubricate the wheel no oil can escape from the wheel. Consequently, it is practicable to pack a wheel of this construction with hard grease for the grease is protected from dirt and it cannot drip out of the lubricating chamber. The wheel can be applied and removed quickly and easily owing to the fact that a single device 10 is employed for retaining the wheel in position; and still another desirable feature of such a construction is that the greatest end thrusts which the wheel receives when it is in service are borne or taken up by the outer end of the axle-box against which the inner end of the hub of the wheel bears. End thrusts in the opposite direction are taken up by the wheel-retaining device 10, the lugs 11 and the overlapping portion 8 on the front end of the axle-box that partially surrounds the device 10. The vertical flange 15 on the front end of the axle-box not only reinforces and strengthens the box, but it bears against the side of the body of the car in such a manner that it reduces the shearing strains on the box-retaining bolts 13 and prevents the axle-box from turning or twisting relatively to the body of the car.

Having thus described my invention, what I claim as new and desire to secure by Letters Patent is:

A wheel of the character described, provided with a hub having an annular rib or abutment that projects radially from the hub adjacent the inner end of same, a lubricating chamber in said hub for receiving the outer end of an axle, closures on the hub for both ends of said chamber, the closure at the inner end of the hub consisting of a beveled washer that is held in an undercut opening in the end of the hub by means of cast metal, an axle-box having a vertical portion that bears against the inner end of the hub and provided at its upper side with a laterally projecting bracket that hangs over the upper side of the hub, gussets or lugs integrally connected to the vertical portion of the box and to said bracket for reinforcing the bracket, and a transversely disposed removable member carried by said bracket and coöperating with the rib on the hub of the wheel for retaining the wheel on the axle.

In testimony whereof I hereunto affix my signature in the presence of two witnesses, this 9th day of July, 1912.

HIRAM A. HOLZER.

Witnesses:
  Geo. H. Stuessi,
  O. K. A. Fritz.